United States Patent
Jeon et al.

(10) Patent No.: US 12,472,946 B2
(45) Date of Patent: Nov. 18, 2025

(54) ACCELERATION LIMIT FUNCTION CONTROL APPARATUS AND METHOD

(71) Applicants: Hyundai Motor Company, Seoul (KR); Kia Corporation, Seoul (KR)

(72) Inventors: Sung Bae Jeon, Hwaseong-si (KR); Gyu Ri Lee, Namyangju-si (KR); In Joo Yeo, Hwaseong-si (KR); Hui Un Son, Suwon-si (KR); Sung Il Jung, Busan (KR)

( * ) Notice: Subject to any disclaimer, the term of this patent is extended or adjusted under 35 U.S.C. 154(b) by 249 days.

(21) Appl. No.: 18/051,696

(22) Filed: Nov. 1, 2022

(65) Prior Publication Data

US 2023/0249685 A1 Aug. 10, 2023

(30) Foreign Application Priority Data

Jan. 19, 2022 (KR) ........................ 10-2022-0007999

(51) Int. Cl.
*B60W 30/16* (2020.01)
*B60W 50/08* (2020.01)
*B60W 50/10* (2012.01)

(52) U.S. Cl.
CPC ........ *B60W 30/162* (2013.01); *B60W 50/085* (2013.01); *B60W 50/10* (2013.01)

(58) Field of Classification Search
CPC .. B60W 30/162; B60W 50/085; B60W 50/10; B60W 50/08; B60W 2720/106; B60W 30/14; B60W 2520/105; B60W 30/146; B60W 30/182; B60W 40/08; B60W 50/0098; B60W 2050/0002; B60W 2540/225; B60W 2554/802; B60R 16/005; B60R 16/0231; B60K 31/00

USPC ........................................................ 701/96
See application file for complete search history.

(56) References Cited

U.S. PATENT DOCUMENTS

| | | | |
|---|---|---|---|
| 2013/0166100 A1* | 6/2013 | Gordh | B60W 30/16 701/1 |
| 2013/0289808 A1* | 10/2013 | Ross | B60W 10/08 903/930 |
| 2018/0079410 A1* | 3/2018 | Yamashita | B60W 30/146 |
| 2018/0118543 A1* | 5/2018 | Hoffman | B66F 9/07572 |
| 2019/0283769 A1 | 9/2019 | Chiba et al. | |
| 2021/0300364 A1* | 9/2021 | Sadamura | B60W 30/146 |

(Continued)

FOREIGN PATENT DOCUMENTS

| | | |
|---|---|---|
| JP | 6413964 B2 | 10/2018 |
| JP | 2020-090205 A | 6/2020 |

(Continued)

*Primary Examiner* — Fadey S. Jabr
*Assistant Examiner* — Paula L Schneider
(74) *Attorney, Agent, or Firm* — Banner & Witcoff, Ltd.

(57) ABSTRACT

An acceleration limit function control apparatus may include a switch unit including a first switch and a second switch. Each of the switches may be configured to generate two input signals associated with different input time durations. The apparatus may be configured to set one of the input signals from the first switch as a mode switching signal for activating an acceleration limit mode and to set each of the input signals from the second switch as a level adjustment signal for increasing or decreasing an acceleration limit level. The apparatus may be configured to increase or decrease the acceleration limit level by the level adjustment signal input in the state in which the acceleration limit mode is activated.

16 Claims, 13 Drawing Sheets

(56) References Cited

U.S. PATENT DOCUMENTS

2023/0399013 A1* 12/2023 Kume ................. B60W 30/162
2024/0149896 A1* 5/2024 Tokunaga ............. B60W 50/10

FOREIGN PATENT DOCUMENTS

| | | | |
|---|---|---|---|
| JP | 2021-143662 A | | 9/2021 |
| KR | 10-2020-0019295 A | | 2/2020 |
| KR | 10-2020-0050495 A | | 5/2020 |
| KR | 10-2020-0122897 A | | 10/2020 |
| WO | WO-2021197440 A1 | * | 10/2021 |

* cited by examiner

ACCELERATION LIMIT FUNCTION CONTROL APPARATUS AND METHOD

CROSS-REFERENCE TO RELATED APPLICATION

This application claims the benefit of Korean Patent Application No. 10-2022-0007999, filed on Jan. 19, 2022, which is hereby incorporated by reference as if fully set forth herein.

BACKGROUND

Field

The present disclosure relates to an acceleration limit function control apparatus and method.

Discussion of the Background

A speed limit assist (SLA) function may be one of driving safety systems, which limits vehicle speed so as not to exceed a speed limit set by a driver.

A smart cruise control (SCC) function may control the degree in acceleration of a vehicle in order to retain the speed set by the driver without additional manipulation and may also perform deceleration control such that safe driving is performed in consideration of the distance from or the speed of a preceding vehicle.

If the smart cruise control (SCC) function and the speed limit assist (SLA) function are independently performed, one switch (e.g. a cruise switch) may be manipulated to selectively activate the smart cruise control function or the speed limit assist function.

Also, acceleration limit control (ALC) may be used to control acceleration such that acceleration does not exceed limit acceleration even when the driver manipulates an accelerator pedal to exceed the limit, whereby the driver experiences a smooth acceleration.

Descriptions in this background section are provided to enhance understanding of the background of the disclosure, and may include descriptions other than those of the prior art already known to those of ordinary skill in the art to which this technology belongs.

SUMMARY

The following summary presents a simplified summary of certain features. The summary is not an extensive overview and is not intended to identify key or critical elements.

With increase of functions adopted for driving safety of the driver, input interfaces configured to manipulate the activated state of various functions may be necessary. However, an input interface that is difficult to manipulate goes against the recent trend to simplify manipulation buttons.

Consequently, in some implementations, the smart cruise control (SCC) function and the speed limit assist (SLA) function may be selectively activated by manipulation of a cruise main switch. However, other additional functions, including the acceleration limit function, may need to be manipulated through a user setting mode (USM) displayed on a display panel of an audio/video/navigation (AVN) system.

In some implementations, in order to activate the acceleration limit function or to adjust the acceleration limit level, the driver may need to manipulate the user setting mode displayed through the AVN system while driving the vehicle, which diverts the driver's attention from driving.

Various examples of an acceleration limit function control apparatus and method are described. The apparatus and/or method may substantially obviate one or more problems, limitations, and/or disadvantages described above or any other problems, limitations, and/or disadvantages of the related art. The apparatus and method may be capable of determining whether to activate an acceleration limit mode and manipulating the degree in increase and decrease of an acceleration limit level using existing switches, whereby it may be possible for a driver to conveniently perform manipulation while looking forwards during driving.

An objective of the present disclosure is to provide an acceleration limit function control apparatus and method capable of determining whether to activate an acceleration limit mode and manipulating the degree in increase and decrease of an acceleration limit level using the existing switches, whereby it may be possible for a driver to conveniently perform manipulation while looking forward during driving.

Other objectives of the present disclosure devised to solve the problems may not be limited to the aforementioned objective, and other unmentioned objectives will be clearly understood by those skilled in the art based on the following detailed description.

An apparatus may comprise: at least one processor; a plurality of switches comprising a first switch and a second switch, wherein each of the first switch and the second switch is configured to generate at least two input signals each associated with a different input time duration, wherein one of the at least two input signals of the first switch is set as a mode switching signal, and wherein the at least two input signals of the second switch are set as level adjustment signals; and memory storing instructions that, when executed by the at least one processor, cause the apparatus to: activate, based on the mode switching signal, an acceleration limit mode; and adjust, based on one of the level adjustment signals, an acceleration limit level while the acceleration limit mode is in an activated state.

The first switch may comprise a cruise main switch configured to generate a first input signal of the at least two input signals of the first switch and a second input signal of the at least two input signals of the first switch, wherein the first input signal of the at least two input signals of the first switch is generated by pressing the cruise main switch for a first time duration, and wherein the second input signal of the at least two input signals of the first switch is generated by pressing the cruise main switch for a second time duration that is greater than the first time duration.

The second switch may comprise an inter-vehicle distance setting switch configured to generate a first input signal of the at least two input signals of the second switch and a second input signal of the at least two input signals of the second switch, wherein the first input signal of the at least two input signals of the second switch is generated by pressing the inter-vehicle distance setting switch for a third time duration, and wherein the second input signal of the at least two input signals of the second switch is generated by pressing the inter-vehicle distance setting switch for a fourth time duration.

A second one of the at least two input signals of the first switch may be set as a mode termination signal. The instructions, when executed by the at least one processor, may further cause the apparatus to: activate, based on a second mode switching signal, another mode of a plurality of modes.

The instructions, when executed by the at least one processor, may further cause the apparatus to: set a smart cruise control mode and a driving assist mode as main modes selectable by the first switch; and set, as sub-modes configured to be sequentially activated by a mode switching signal for the driving assist mode, an initial mode in which both a speed limit assist mode and the acceleration limit mode are activated, a primary transition mode in which the speed limit assist mode is activated, and a secondary transition mode in which the acceleration limit mode is activated.

The instructions, when executed by the at least one processor, may further cause the apparatus to: set a smart cruise control mode and a driving assist mode as main modes selectable by the first switch; and set, as sub-modes configured to be sequentially activated by a mode switching signal for the driving assist mode, an initial mode in which a speed limit assist mode is activated, a primary transition mode in which both the speed limit assist mode and the acceleration limit mode are activated, and a secondary transition mode in which the acceleration limit mode is activated.

The instructions, when executed by the at least one processor, may further cause the apparatus to: set a smart cruise control mode and a driving assist mode as main modes selectable by the first switch; and set, as sub-modes for the driving assist mode, an initial mode in which both a speed limit assist mode and the acceleration limit mode are activated and a primary transition mode in which the speed limit assist mode is activated, wherein the initial mode and the primary transition mode are alternately selected in response to a mode switching signal for the driving assist mode.

The instructions, when executed by the at least one processor, may further cause the apparatus to: set, based on a vehicle driving state determined through vehicle information, an automatic level, wherein the acceleration limit level is automatically adjusted based on the automatic level being set.

An apparatus may comprise: at least one processor; a plurality of switches comprising a first switch and a second switch, wherein each of the first switch and the second switch is configured to generate at least two input signals each associated with a different input time duration, wherein a combination of a first input signal of the at least two input signals of the first switch and a first input signal of the at least two input signals of the second switch is set as a mode switching signal, and wherein at least one remaining input signal of the at least two input signals of the second switch is set as a level adjustment signals; and memory storing instructions that, when executed by the at least one processor, cause the apparatus to: activate, based on the mode switching signal, an acceleration limit mode; and adjust, based on the level adjustment signal, an acceleration limit level while the acceleration limit mode is in an activated state.

The first switch may comprise a cruise main switch configured to generate the first input signal of the at least two input signals of the first switch and a second input signal of the at least two input signals of the first switch, wherein the first input signal of the at least two input signals of the first switch is generated by pressing the cruise main switch for a first time duration, and wherein the second input signal of the at least two input signals of the first switch is generated by pressing the cruise main switch for a second time duration that is greater than the first time duration.

The second switch may comprise a left paddle shift and a right paddle shift. The left paddle shift may be configured to generate a first input signal of the at least two input signals of the second switch and a second input signal of the at least two input signals of the second switch, wherein the first input signal of the at least two input signals of the second switch is generated by pressing the left paddle shift for a third time duration, and wherein the second input signal of the at least two input signals of the second switch is generated by pressing the left paddle shift for a fourth time duration. The right paddle shift may be configured to generate a third input signal of the at least two input signals of the second switch and a fourth input signal of the at least two input signals of the second switch, wherein the third input signal of the at least two input signals of the second switch is generated by pressing the right paddle shift for a fifth time duration, and wherein the fourth input signal of the at least two input signals of the second switch is generated by pressing the right paddle shift for a sixth time duration.

A second input signal of the at least two input signals of the first switch may be set as a mode termination signal. The instructions, when executed by the at least one processor, may further cause the apparatus to: activate, based on a sub-mode switching signal, another mode of a plurality of modes, wherein the sub-mode switching signal is set based on at least one remaining input signal of the at least two input signals of the second switch.

The instructions, when executed by the at least one processor, may further cause the apparatus to: set a smart cruise control mode and a driving assist mode as main modes selectable by the first switch; and set, as sub-modes configured to be sequentially activated by a sub-mode switching signal for the driving assist mode, an initial mode in which both a speed limit assist mode and the acceleration limit mode are activated, a primary transition mode in which the speed limit assist mode is activated, and a secondary transition mode in which the acceleration limit mode is activated. The sub-mode switching signal may be set based on at least one remaining input signal of the at least two input signals of the second switch.

The instructions, when executed by the at least one processor, may further cause the apparatus to: set the first input signal of the at least two input signals of the second switch as a sub-mode switching signal for performing a reverse transition from a secondary transition mode to a primary transition mode or from the primary transition mode to an initial mode; and set the third input signal of the at least two input signals of the second switch as a sub-mode switching signal for performing a forward transition from the initial mode to the primary transition mode or from the primary transition mode to the secondary transition mode.

The instructions, when executed by the at least one processor, may further cause the apparatus to: set one of the second input signal of the at least two input signals of the second switch and the fourth input signal of the at least two input signals of the second switch as a level adjustment signal for decreasing the acceleration limit level; and set the other one of the second input signal of the at least two input signals of the second switch and the fourth input signal of the at least two input signals of the second switch as a level adjustment signal for increasing the acceleration limit level.

A method may comprise: setting, by an apparatus of a vehicle, an input signal of a first switch as a mode switching signal for activating an acceleration limit mode; setting an input signal of a second switch as a level adjustment signal for adjusting an acceleration limit level of the acceleration limit mode; setting a smart cruise control mode and a driving assist mode that are selectable by the mode switching signal; setting, for the driving assist mode, at least two sub-modes comprising the acceleration limit mode; activating, based on receiving the mode switching signal, the acceleration limit mode, wherein the at least two sub-modes are changed in a preconfigured transition order; and adjusting, based on receiving the level adjustment signal, an acceleration limit level while the acceleration limit mode is in an activated state.

The first switch may comprise a cruise main switch configured to generate the input signal of the first switch as a first input signal of the first switch and generate a second input signal of the first switch, wherein the first input signal of the first switch is generated by pressing the cruise main switch for a first time duration, and the second input signal of the first switch is generated by pressing the cruise main switch for a second time duration that is different from the first time duration. The method may further comprise setting the second input signal of the first switch as a mode termination signal for deactivating the acceleration limit mode.

The second switch may comprise an inter-vehicle distance setting switch to generate the input signal of the second switch as a first input signal of the second switch and generate a second input signal of the second switch, wherein the first input signal of the second switch is generated by pressing the inter-vehicle distance setting switch for a third time duration, and the second input signal of the second switch is generated by pressing the inter-vehicle distance setting switch for a fourth time duration. The setting the input signal of the second switch as the level adjustment signal may comprise: setting the first input signal of the second switch as a level adjustment signal for increasing the acceleration limit level, and setting the second input signal of the second switch as a level adjustment signal for decreasing the acceleration limit level.

The setting the driving assist mode may comprise: setting the smart cruise control mode and the driving assist mode as main modes selectable by the first switch, and setting, as sub-modes configured to be sequentially activated by a mode switching signal for the driving assist mode, an initial mode in which both a speed limit assist mode and the acceleration limit mode are activated, a primary transition mode in which the speed limit assist mode is activated, and a secondary transition mode in which the acceleration limit mode is activated.

These and other features and advantages are described in greater detail below.

BRIEF DESCRIPTION OF THE DRAWINGS

The accompanying drawings, which are included to provide a further understanding of the disclosure and are incorporated in and constitute a part of this application, illustrate various examples of the disclosure. In the drawings.

DETAILED DESCRIPTION

Figure 1:
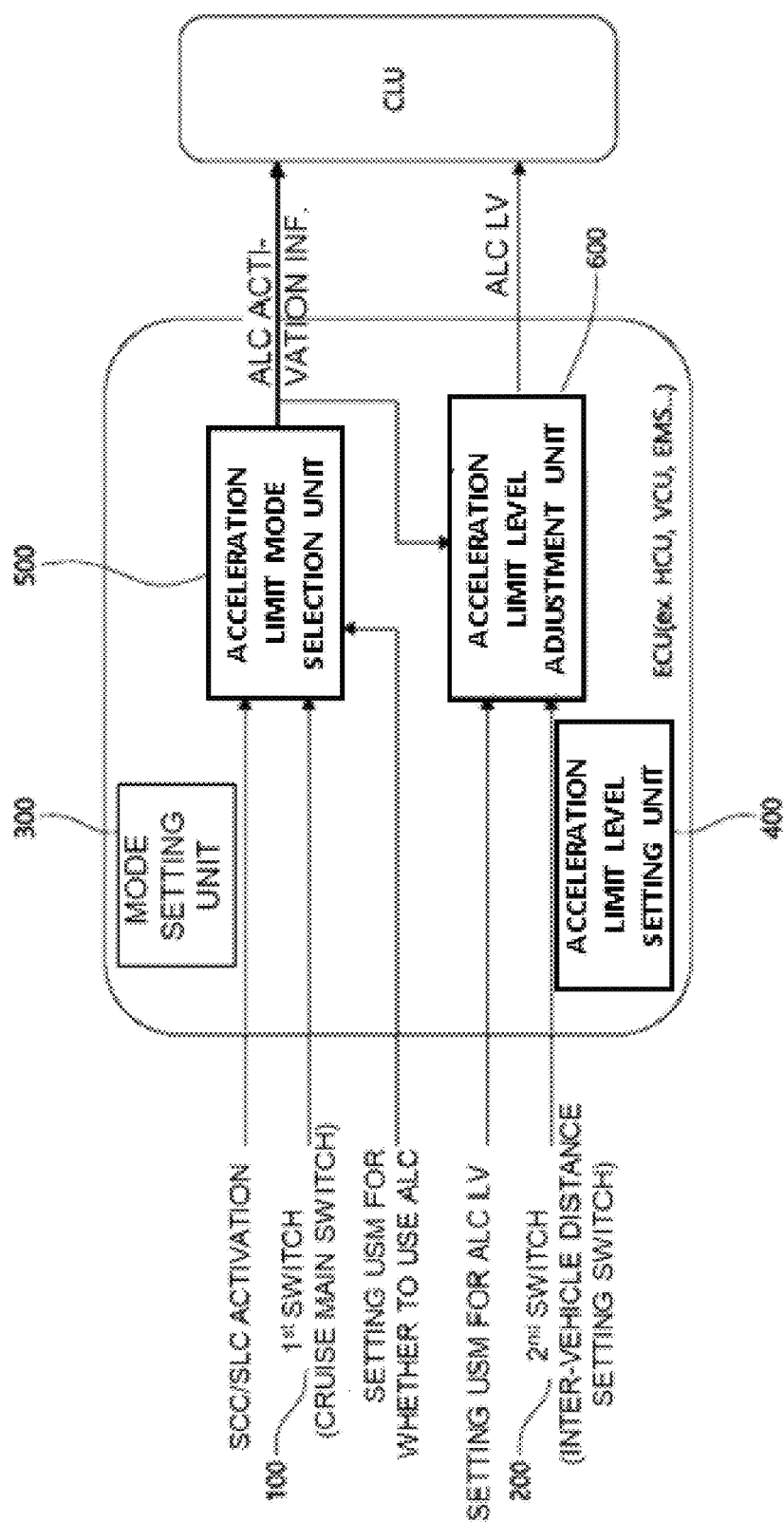
FIG. 1 is a diagram showing an acceleration limit function control apparatus.

Description will now be given in detail, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the examples presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that, when a component is referred to as being "connected to" or "coupled to" another component, it may be directly connected to or coupled to the other component, or intervening components may be present. In contrast, when a component is referred to as being "directly connected to" or "directly coupled to" another component, there are no intervening components present.

A singular representation may include a plural representation unless it represents a definitely different meaning from the context.

It will be further understood that the terms "comprises", "has" and the like, when used in this specification, specify the presence of stated features, numbers, steps, operations, elements, components or combinations thereof, but do not preclude the presence or addition of one or more other features, numbers, steps, operations, elements, components, or combinations thereof.

In addition, "unit" or "control unit" included in names, such as a motor control unit and a hybrid control unit, is a term that is widely used to name a controller that controls a specific function of a vehicle, but does not mean a generic functional unit. For example, each control unit may include a communication device that communicates with another control unit or a sensor in order to control an assigned function, a memory that stores an operating system, logic commands, and input and output information, and at least one processor that performs determination, calculation, and decision necessary to control the assigned function.

Hereinafter, various examples of the present disclosure will be described in detail with reference to the accompanying drawings.

Figure 2:
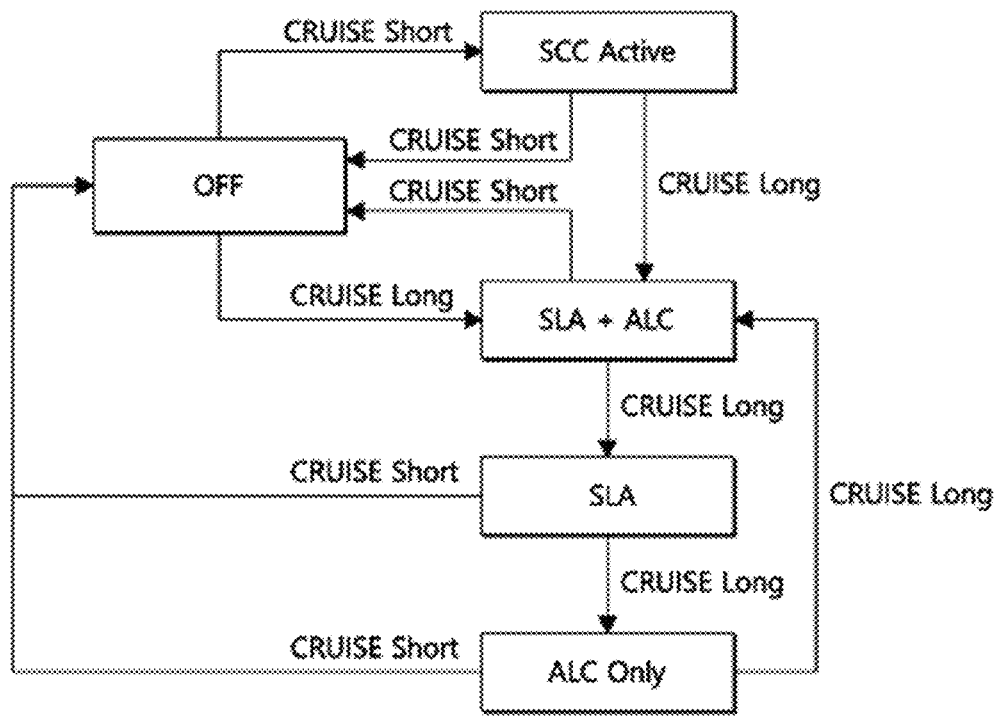
FIG. 2 is a flowchart showing an example in which an acceleration limit mode is selected by a mode switching signal.
Figure 3:
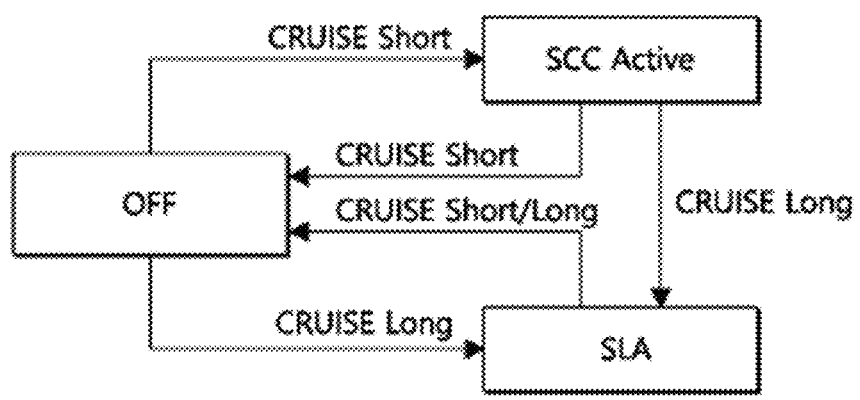
FIG. 3 is a flowchart showing an example in which a mode is selected when the acceleration limit mode is not used.

FIG. 1 shows a diagram showing an acceleration limit function control apparatus, FIG. 2 shows an example in which an acceleration limit mode is selected by a mode switching signal, and FIG. 3 shows an example in which a mode is selected when the acceleration limit mode is not used.

Referring to FIG. 1, the acceleration limit function control apparatus may include a plurality of switches including a first switch 100 and a second switch 200, a signal setting units (e.g., a mode setting unit 300 and an acceleration limit level setting unit 400), an acceleration limit mode selection unit 500, and an acceleration limit level adjustment unit 600. Each of the first switch 100 and the second switch 200 may be configured to allow two inputs having different input durations of time. The signal setting units (e.g., a mode setting unit 300 and an acceleration limit level setting unit 400) may be configured to set one of the inputs from the first switch as a mode switching signal for activating an acceleration limit mode and to set each of the inputs from the second switch as a level adjustment signal for increasing or decreasing an acceleration limit level. The acceleration limit mode selection unit 500 may be configured to activate the acceleration limit mode by the mode switching signal input under predetermined conditions. The acceleration limit level adjustment unit 600 may be configured to increase or decrease the acceleration limit level by the level adjustment signal input in the state in which the acceleration limit mode is activated.

Each of the first switch 100 and the second switch 200 may comprise a switch provided to manipulate a function other than an acceleration limit function. Each of the first switch 100 and the second switch 200 may comprise a switch configured to be intuitively manipulated such that the driver is not distracted from driving while manipulating the acceleration limit function.

As shown in FIG. 1, the first switch 100 may comprise a cruise main switch capable of determining whether to perform a smart cruise control (SCC) function. The second switch 200 may comprise an inter-vehicle distance setting switch capable of setting an inter-vehicle distance.

The cruise main switch and the inter-vehicle distance setting switch may allow a driver to determine whether to activate the smart cruise control function and to increase or decrease an inter-vehicle distance during smart cruise control driving, respectively. Because the driver may intuitively manipulate the cruise main switch and the inter-vehicle distance setting switch without losing his/her attention on the front sight, if the switches are used for the first and second switches, respectively, then intuitive manipulation for the functionalities associated with the first and second switches may be possible.

'CLU' in FIG. 1 indicates an instrument cluster (or its controller) of a vehicle. However, other types of controllers may be used additionally or alternatively.

Figure 4:
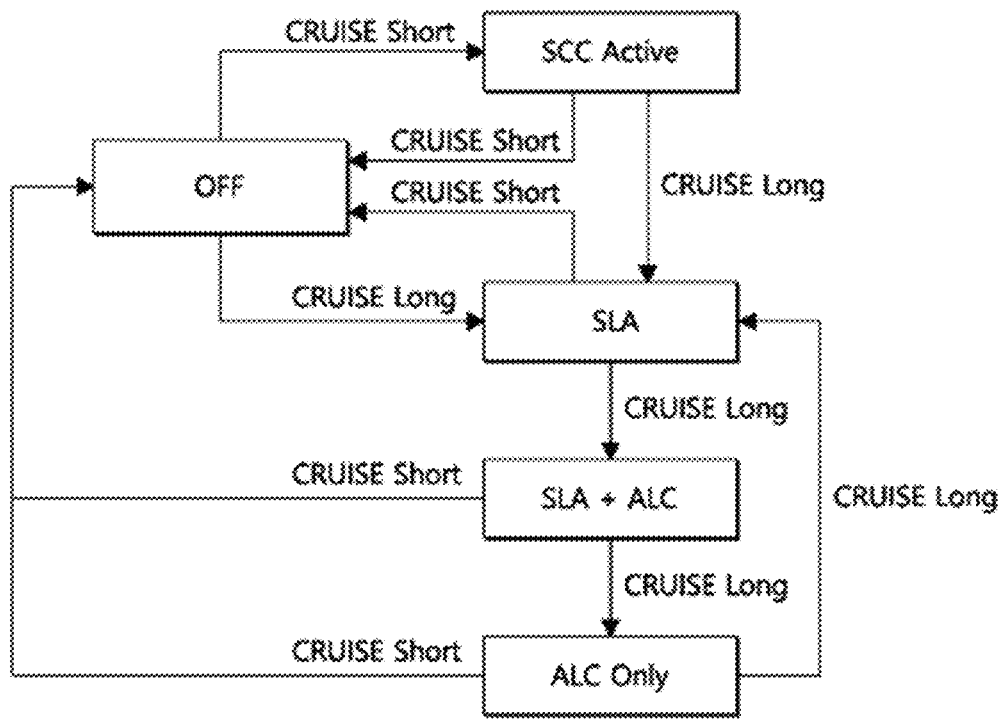
FIG. 4 is a view showing a dashboard screen that displays the current mode selected by the mode switching signal.

A 1A signal (e.g., generated if the driver presses the first switch 100 for a preconfigured first input duration of time (e.g. about 2 to 3 seconds)) and a 1B signal (e.g., generated if the driver presses the first switch 100 for a preconfigured second input duration of time (e.g. less than about 1 second)) may be separately input from the first switch 100. The first input duration of time may be set to be longer than the second input duration of time. In FIGS. 2 to 4, the 1A signal is indicated by CRUISE Long, and the 1B signal is indicated by CRUISE Short.

Figure 6:
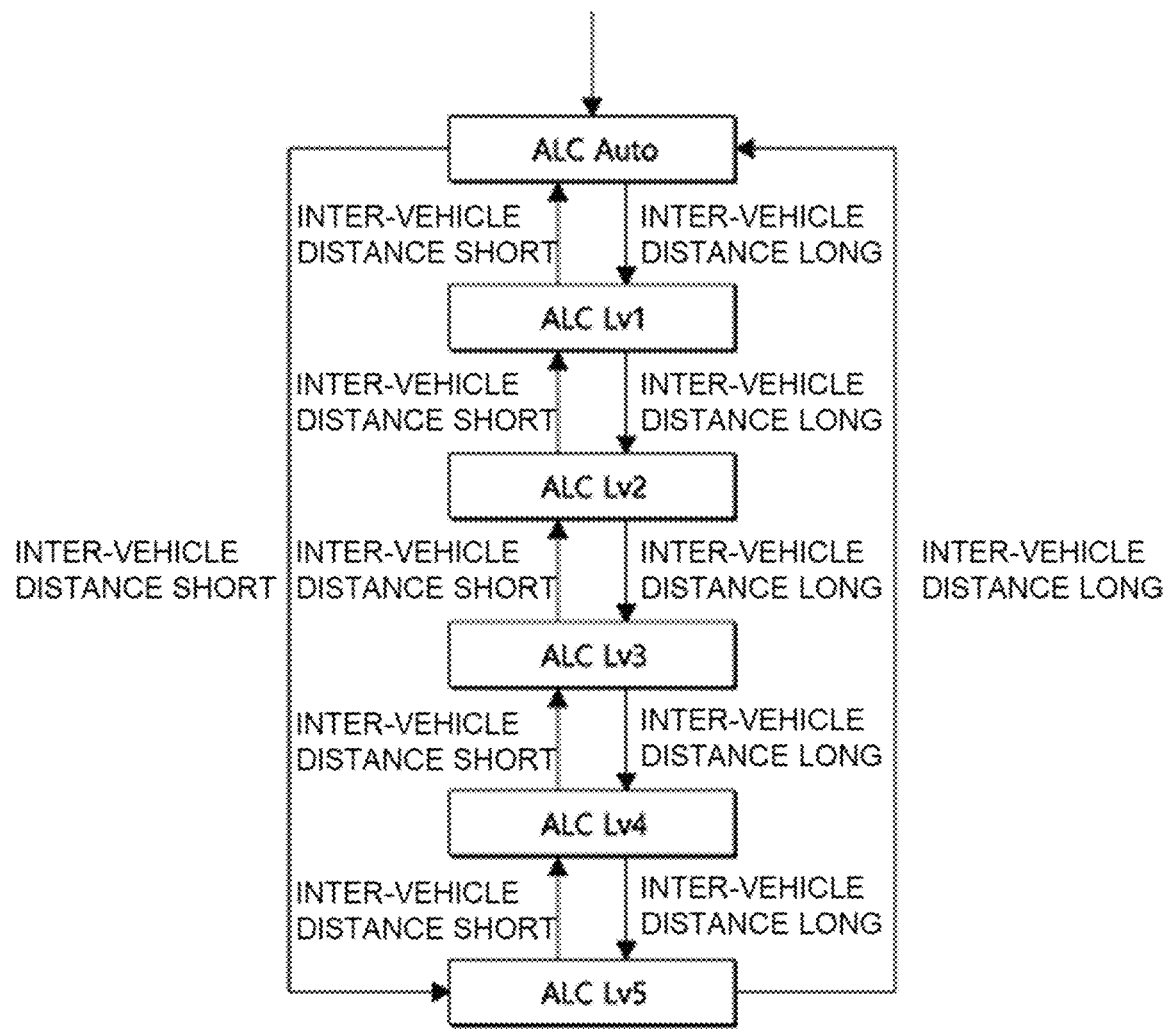
FIG. 6 is a view showing the dashboard screen that displays the current acceleration limit level changed by the level adjustment signal.

A 2A signal (e.g., generated if the driver presses the second switch 200 for a preconfigured third input duration of time (e.g. about 2 to 3 seconds)) and a 2B signal (e.g., generated if the driver presses the second switch 200 for a preconfigured fourth input duration of time (e.g. less than about 1 second)) may be separately input from the second switch 200. The third input duration of time may be set to be longer than the fourth input duration of time. In FIG. 6, the 2A signal is indicated by Inter-vehicle Distance Long, and the 2B signal is indicated by Inter-vehicle Distance Short. In some implementations, the first input duration of time and the third input duration of time may be the same, and the second input duration of time and the fourth input duration of time may be the same.

Manipulation of the first switch and the second switch (e.g., pressing the switch(es) for a long period or a short period) may also be used to determine whether to activate the smart cruise control function and to set the inter-vehicle distance.

In order to avoid confusion between the functions selected through the first and second switches, the signal setting unit may include a plurality of setting units, such as the mode setting unit 300 and the acceleration limit level setting unit 400. The mode setting unit 300 may be configured to set one of the input signals from the first switch as a mode switching signal, to set the other input signal as a mode termination signal, and to set a plurality of modes sequentially activated by the mode switching signal. The acceleration limit level setting unit 400 may be configured to set one of the input signals from the second switch as a level adjustment signal for increasing a level, to set the other input signal as a level adjustment signal for decreasing a level, and to set an acceleration limit level increased or decreased by the level adjustment signal.

In FIG. 2, the 1A signal (CRUISE Long) is set as a mode switching signal, and the 1B signal (CRUISE Short) is set as a mode termination signal. In FIG. 6, the 2A signal (Inter-vehicle Distance Long) is set as a level adjustment signal for increasing a level, and the 2B signal (Inter-vehicle Distance Short) is set as a level adjustment signal for decreasing a level. However, aspects of the mode switching signal and the level adjustment signal are not limited to the above examples, and may be interchanged with each other or may be differently configured.

The mode setting unit 300 may set a smart cruise control mode and a driving assist mode as main modes selectable by the first switch. The mode setting unit 300 may set one of the 1A signal and the 1B signal as a signal for selecting the smart cruise control mode in an off state in which there is no activated mode and may set the other signal as a signal for selecting the driving assist mode.

The driving assist mode may include the state in which both a speed limit assist mode and an acceleration limit mode (SLA+ALC) are activated, the state in which only the speed limit assist mode is activated (SLA), and the state in which only the acceleration limit mode is activated (ALC) as sub-modes.

As shown in FIG. 2, the mode setting unit 300 may set the mode in which both the speed limit assist mode and the acceleration limit mode (SLA+ALC) are activated as an initial mode, may set the speed limit assist mode (SLA) as a primary transition mode, and may set the acceleration limit mode (ALC Only) as a secondary transition mode, as sub-modes sequentially activated by the mode switching signal (e.g., CRUISE Long).

The mode setting unit 300 may perform setting such that the mode is switched from the initial mode to the primary transition mode, from the primary transition mode to the secondary transition mode, and from the secondary transition mode to the initial mode, whereby the modes may be sequentially activated (e.g., with a circular loop as shown in FIG. 2) whenever the mode switching signal is input.

The transition order of the sub-modes activated in the driving assist mode may be set differently from the example of FIG. 2.

As shown in FIG. 4, the mode setting unit 300 may set the mode in which the speed limit assist mode (SLA) is activated as the initial mode, may set the mode in which both the speed limit assist mode and the acceleration limit mode (SLA+ALC) are activated as the primary transition mode, and may set the acceleration limit mode (ALC Only) as the secondary transition mode.

Figure 5:
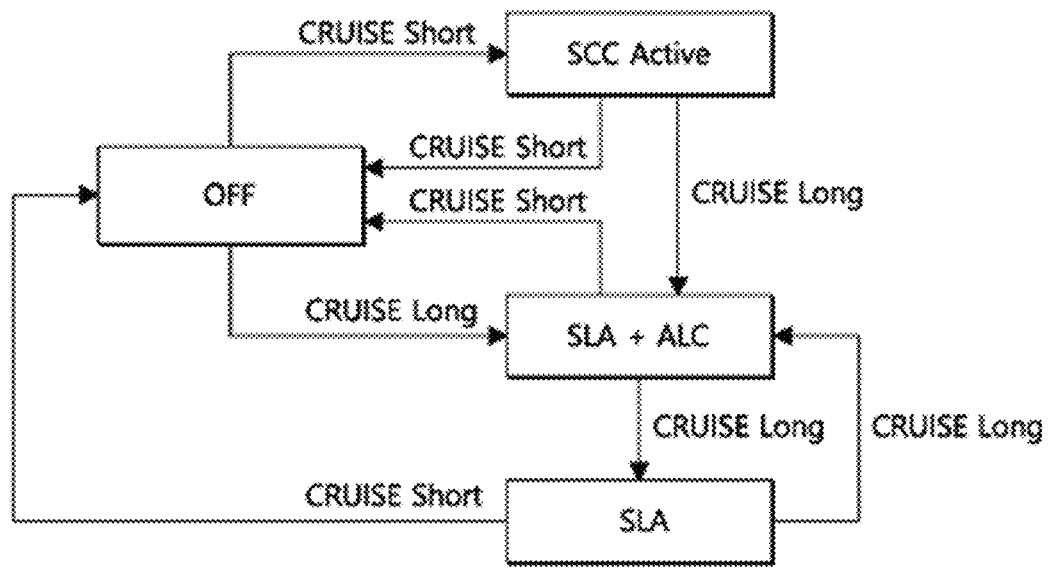
FIG. 5 is a flowchart showing an example in which an acceleration limit level is changed by a level adjustment signal after the acceleration limit mode is activated.

As shown in FIG. 5, the mode setting unit 300 may exclude the mode in which only the acceleration limit mode (ALC) is activated, and may perform setting such that the state in which both the speed limit assist mode and the acceleration limit mode (SLA+ALC) are activated, set as the initial mode, and the state in which only the speed limit assist mode (SLA) is activated, set as the primary transition mode, are alternately selected whenever the mode switching signal is input after entry into the driving assist mode.

If a manipulation is performed such that the limit mode is not used in a user setting mode (USM) using an AVN system before driving of the vehicle, only transition from the smart cruise control mode (ACC Active) to the speed limit assist mode (SLA) may be possible, as shown in FIG. 3.

The acceleration limit level setting unit 400 may perform setting such that acceleration limit levels ACL Lv1 to ACL Lv5 set in the acceleration limit mode are increased or decreased from the current state by one level (or multiple levels) whenever the level adjustment signal is input.

The acceleration limit level setting unit 400 may perform setting such that, if a level adjustment signal for increasing the level is input in the state in which the acceleration limit level is the highest level, the acceleration limit level may be changed to the lowest level, and if a level adjustment signal for decreasing the level is input in the state in which the acceleration limit level is the lowest level, the acceleration limit level may be changed to the highest level.

Since a setting change is performed such that the current acceleration limit level is changed from the highest level to the lowest level and is changed from the lowest level to the highest level, as described above, driver's manipulation convenience and safety may be achieved. For example, it may be possible to increase or decrease the acceleration limit level by intuitive manipulation of long or short pressing of the switch without losing an attention on the front sight.

As shown in FIG. 6, the acceleration limit level setting unit 400 may perform a setting change such that an automatic level (ALC Auto) of automatically changing the acceleration limit level is further included in consideration of the vehicle driving state acquired through vehicle information. In the automatic level, an appropriate acceleration limit level may be selected based on the vehicle driving state recognized (e.g., using vehicle speed, accelerator depressing information (via an accelerator pedal sensor (APS)), brake depressing information (via a brake pedal sensor (BPS)), a road type, lane information, road congestion, and/or preceding vehicle information).

A configuration may be set such that the automatic level (ALC Auto) may be selected when a level adjustment signal for decreasing a level is input in the lowest level state or when a level adjustment signal for increasing a level is input in the highest level state.

The acceleration limit mode selection unit 500 may perform a control operation such that, upon receiving the mode switching signal from the first switch 100, modes (including sub-modes) activated in a predetermined order are sequentially changed, and upon receiving the mode termination signal from the first switch 100, the activated mode is terminated and the mode returns to the off state.

For example, if the mode switching signal (CRUISE Long) is input during the off state, as shown in FIG. 2, the acceleration limit mode selection unit 500 may enter the driving assist mode and activates the sub-modes set as the initial modes (e.g., both the speed limit assist mode and the acceleration limit mode (SLA+ALC)).

Subsequently, if the mode switching signal (CRUISE Long) is input again, the sub-mode may be changed to the primary transition mode to activate only the speed limit assist mode (SLA). If the mode switching signal (CRUISE Long) is input again in this state, the sub-mode may be changed to the secondary transition mode to activate only the acceleration limit mode (ALC Only). If the mode switching signal (CRUISE Long) is input again in the state in which only the acceleration limit mode is activated, the initial mode may be activated. In this way, the sub-modes may be changed in a circular loop.

Figure 7:
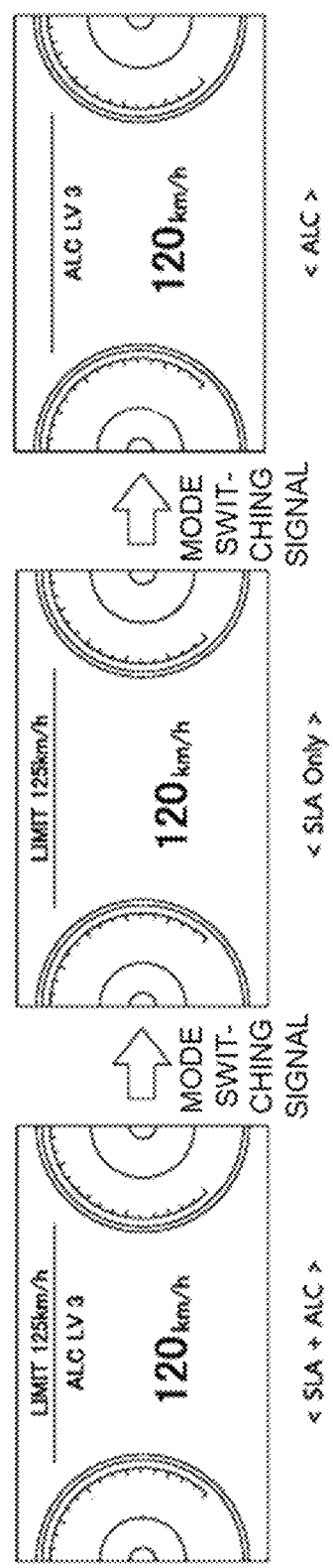
FIG. 7 is a view showing the dashboard screen that sequentially displays an example in which the acceleration limit level is manipulated in the state in which only the acceleration limit mode is activated.

Information about the current mode may be displayed on an instrument cluster of the vehicle, for example, as shown in FIG. 7, while the mode switching signal is input, as described above, whereby it may be possible for the driver to visually recognize the currently activated state.

FIG. 7 shows that the speed limit assist mode and the acceleration limit mode (SLA+ALC), set as the initial mode, and acceleration limit level 3 (ALC LV 3) are activated. The speed limit assist mode may be recognized by "LIMIT 125 km/h".

Subsequently, if the mode switching signal is input, "ALC LV 3" is removed from the previous state and only "LIMIT 125 km/h" is displayed, whereby it may be possible for the driver to recognize that the acceleration limit mode (ALC) is disabled or deactivated and only the speed limit assist mode (SLA) is activated.

If the mode switching signal is input again, "LIMIT 125 km/h" is removed from the previous state and only "ALC LV 3" is displayed, whereby it may be possible for the driver to recognize that the speed limit assist mode (SLA) is disabled or deactivated and only the acceleration limit mode (ALC) is activated.

The acceleration limit level adjustment unit 600 may increase or decrease an acceleration limit level upon receiving a level adjustment signal from the second switch in the state in which the acceleration limit mode (ALC) is activated.

Figure 8:
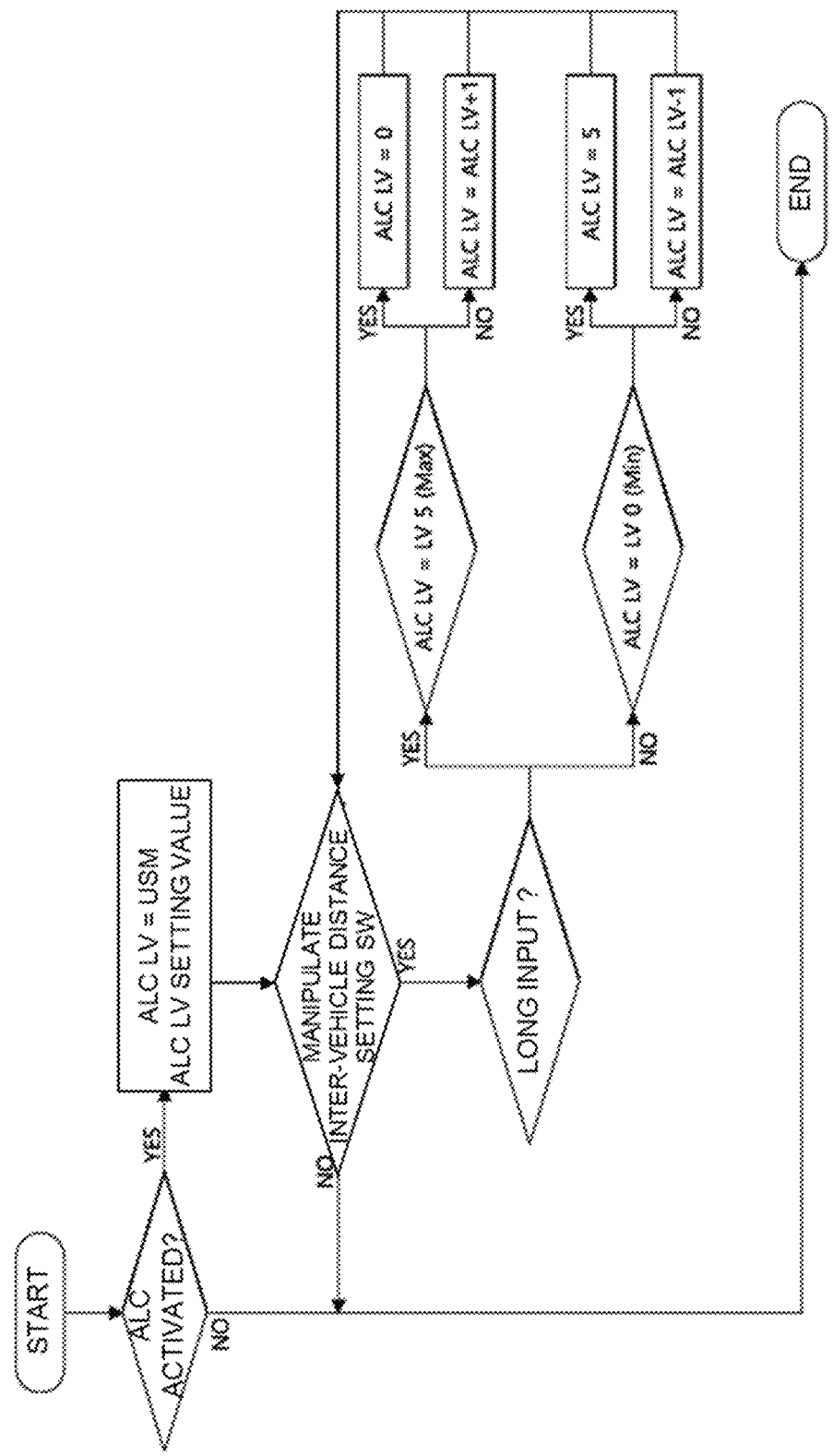
FIG. 8 is a flowchart showing an example in which the circulation order of a mode selected by the mode switching signal is differently set.

For example, if a level adjustment signal for increasing a level is input in the state in which the acceleration limit mode (ALC) is activated, as shown in FIGS. 6 and 8, the acceleration limit level adjustment may increase the current acceleration limit level by one step (or multiple levels at a time). If a level adjustment signal for decreasing a level is input, the acceleration limit level adjustment unit 600 may decrease the current acceleration limit level by one step (or multiple levels at a time).

The acceleration limit mode (ALC) may be activated, and the level set as the initial value may be automatically set as the acceleration limit level. Subsequently, the acceleration limit level may be increased or decreased by the level adjustment signal.

As shown in FIG. 8, the acceleration limit level adjustment unit 600 may determine whether the input from the second switch is a level adjustment signal for increasing a level (e.g., Inter-vehicle Distance Long). If the input from the second switch is a level adjustment signal for increasing a level (Inter-vehicle Distance Long) (YES), determines whether the current acceleration limit level is the highest level (ALC LV=LV 5 (Max)). If the current acceleration limit level is not the highest level, the acceleration limit level may be increased by one step (ALC LV=ALC LV+1). If the current acceleration limit level is the highest level, the acceleration limit level may be changed to the lowest level (ALC LV=0).

If the input from the second switch is a level adjustment signal for decreasing a level (e.g., Inter-vehicle Distance Short), the acceleration limit level adjustment unit 600 may determine whether the current acceleration limit level is the lowest level (ALC LV=LV 0 (Min)). If the current acceleration limit level is not the lowest level, the acceleration limit level is decreased by one step (ALC LV=ALC LV−1). If the current acceleration limit level is the lowest level, the acceleration limit level may be changed to the highest level (ALC LV=5).

Figure 9:
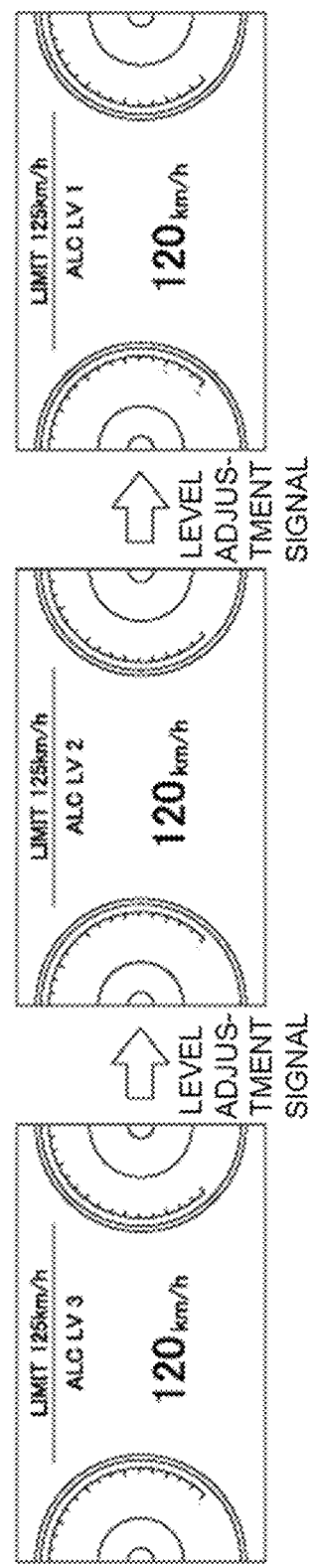
FIG. 9 is a diagram showing an example in which the circulation order of a mode selected by the mode switching signal is differently set.

As shown in FIG. 9, information about the acceleration limit level adjusted may be displayed on the instrument cluster, whereby the driver may visually recognize the currently selected acceleration limit level. For example, FIG. 9 shows that, whenever the level adjustment signal is input, the acceleration limit level is sequentially decreased from LV 3 to LV 2 and from LV 2 to LV 1.

Figure 10:
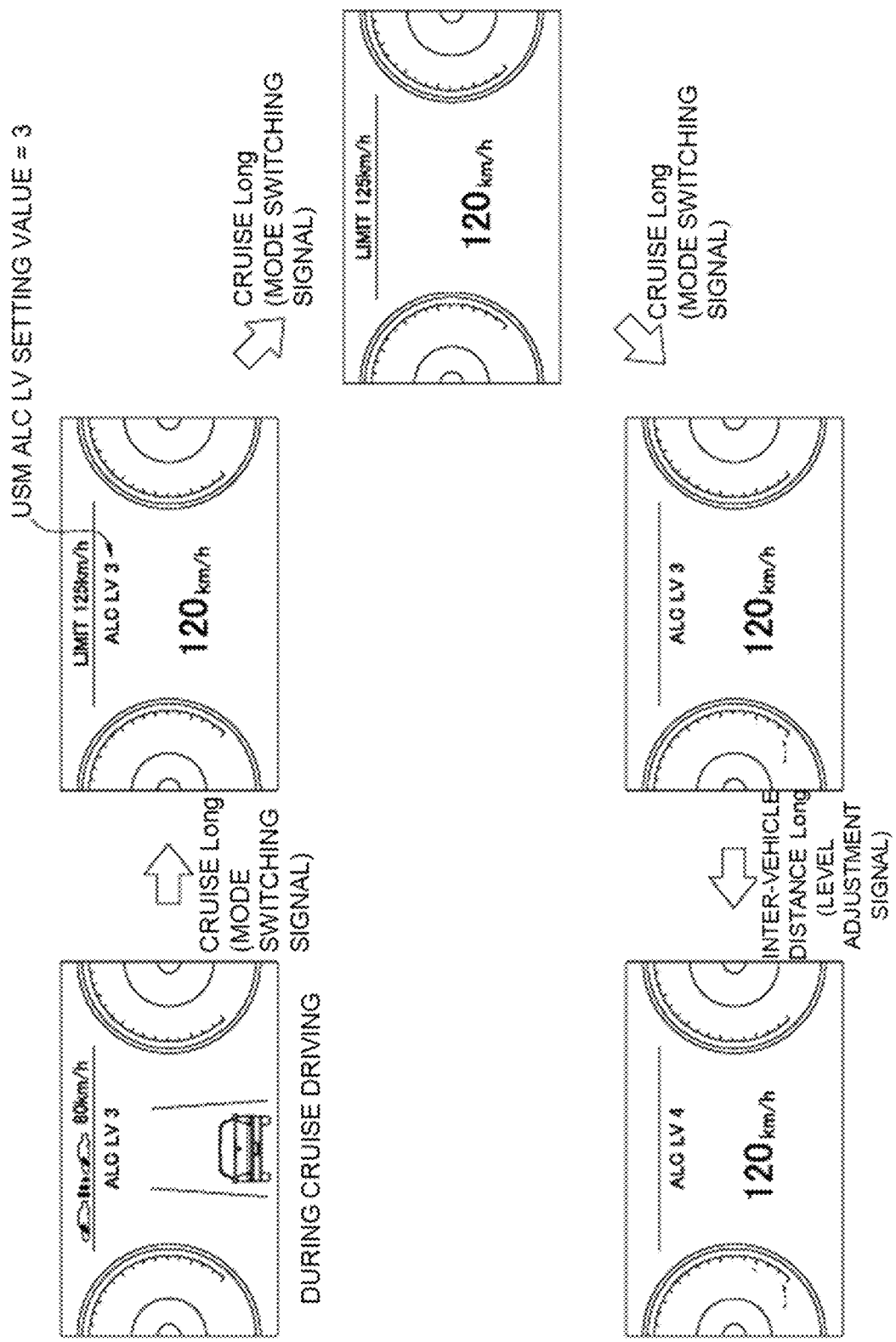
FIG. 10 is a diagram showing an example in which a paddle shift manipulation signal is received as the mode switching signal to select the acceleration limit mode.

Next, the dashboard screen when the acceleration limit mode and the acceleration limit level are adjusted will be described with reference to FIG. 10. As shown in FIG. 10, if a mode switching signal (CRUISE Long) is input from the first switch during smart cruise driving, both the speed limit assist mode (SLA) and the acceleration limit mode (ALC) may be activated according to a preconfigured initial mode, and the speed limit information (LIMIT 125 km/h) and the acceleration limit level (ALC LV 3) may be displayed on the instrument cluster.

Subsequently, if the mode switching signal (CRUISE Long) is input again, only the speed limit assist mode (SLA) may be activated, and information related to the acceleration limit level may be removed (or replaced with other information). If the mode switching signal (CRUISE Long) is input again in this state, only the acceleration limit mode (ALC) may be activated, and the acceleration limit level (ALC LV 3) set as the initial value may be displayed.

If a level adjustment signal for increasing a level (e.g., Inter-vehicle Distance Long) is input from the second switch in the state in which only the acceleration limit mode (ALC) is activated, as described above, the current acceleration limit level may be increased by one step (to ALC LV 4), and information indicating the increased acceleration limit level may be displayed so that the updated information is recognized by the driver.

In some implementations, the acceleration limit function control apparatus may include a plurality of switches including a first switch and a third switch, a signal setting unit, an acceleration limit mode selection unit, and an acceleration limit level adjustment unit. Each of the plurality of switches may be configured to allow two inputs having different input duration of times to be manipulated therefrom. The signal setting unit may be configured to set some of the inputs from the first switch and the third switch mode switching signal for activating an acceleration limit mode and to set the other of the inputs from the third switch as a level adjustment signal for increasing or decreasing an acceleration limit level. The acceleration limit mode selection unit may be configured to activate the acceleration limit mode by the mode switching signal input under preconfigured conditions. The acceleration limit level adjustment unit may be configured to increase or decrease the acceleration limit level by the level adjustment signal input in the state in which the acceleration limit mode is activated.

The first switch and the third switch may be switches already provided to manipulate different functions. For example, the first switch may be a cruise main switch capable of determining whether to perform a smart cruise control (SCC) function, and the third switch may be a paddle shift that performs behaviors according to an economy mode and a sport mode in a hybrid electric vehicle. In some implementation, an inter-vehicle distance setting switch configured to increase or decrease an inter-vehicle distance retained during smart cruise control driving may be used only to manipulate the inter-vehicle distance.

The paddle shift may be used to adjust regenerative braking steps while a (plug-in) hybrid electric vehicle ((P) HEV) is driven in the economy mode and may be used to manually adjust a gear shift while the (plug-in) hybrid electric vehicle is driven in the sport mode. An input from the paddle shift may be used to change a sub-mode after an entry into a driving assist mode or to control an increase or decrease in acceleration limit level in the state in which the acceleration limit mode is activated (e.g., in addition to the original function of the paddle shift).

A 1A signal (e.g., generated if the driver presses the first switch for a preconfigured first input duration of time (e.g. about 2 to 3 seconds)) and a 1B signal (e.g., generated if the driver presses the first switch for a preconfigured second input duration of time (e.g. less than about 1 second)) may be separately input from the first switch. The first input duration of time may be set to be longer than the second input duration of time.

Figure 11:
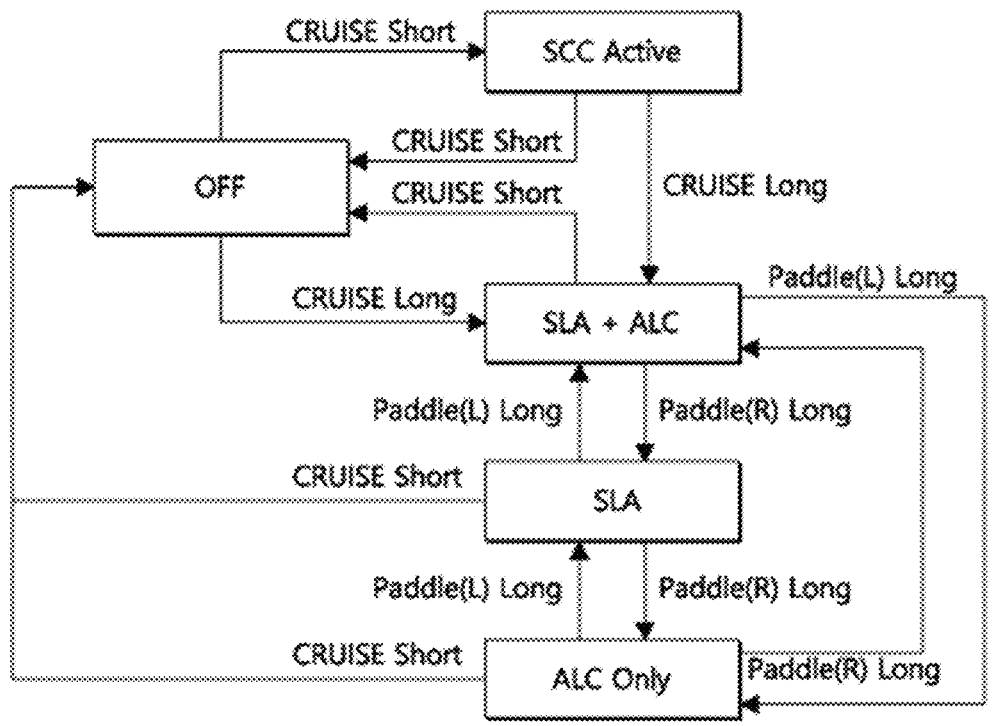
FIG. 11 is a flowchart showing an example in which the paddle shift manipulation signal 1 is received as the level adjustment signal to change the acceleration limit level.
Figure 12:
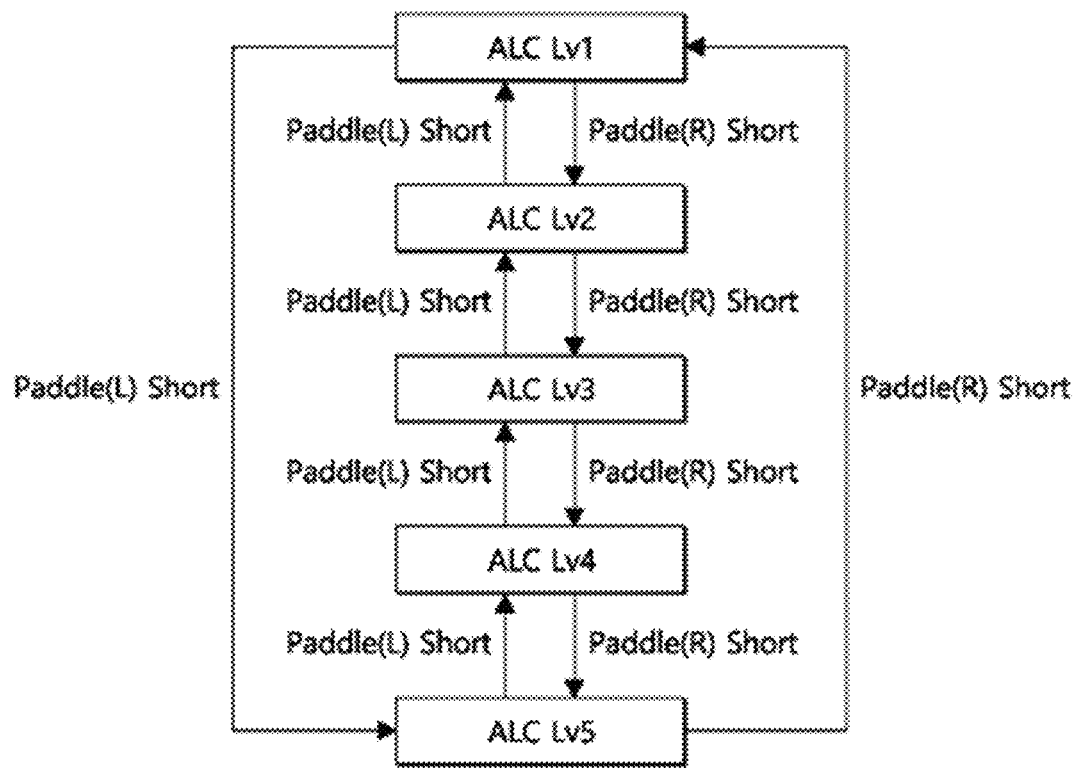
FIG. 12 is a flowchart showing an example in which the acceleration limit level is changed.

The third switch may be implemented by a left paddle shift Paddle (L) and a right paddle shift Paddle (R). For example, the third switch (e.g., the left and right shift paddles as two switches) may be manipulated by the driver. A 3A signal (e.g., generated if the driver presses the paddle shifts for a fifth input duration of time (e.g. about 2 to 3 seconds)) and a 4A signal (e.g., generated if the driver presses the paddle shifts for a seventh input duration of time (e.g. about 2 to 3 seconds)) may be respectively input from the paddle shifts. A 3B signal (e.g., generated if the driver presses the paddle shifts for a sixth input duration of time (e.g. less than about 1 second)) and a 4B signal (e.g., generated if the driver presses the paddle shifts for an eighth input duration of time (e.g. less than about 1 second)) may be respectively input from the paddle shifts. As such, the four different signals may be input from the paddle shifts. In FIGS. 11 and 12, the 3A signal is indicated by Paddle (L) Long (e.g., for the fifth input duration of time), the 4A signal is indicated by Paddle (R) Long (e.g., for the seventh input duration of time), the 3B signal is indicated by Paddle (L) Short (e.g., for the sixth input duration of time), and the 4B signal is indicated by Paddle (R) Short (e.g., for the eighth input duration of time).

Manipulation of long or short pressing the first switch and/or the third switch may also be used to determine whether to activate the smart cruise control function and/or to manipulate the original function of the paddle shift.

In order to avoid confusion between the functions, the signal setting unit may include a mode setting unit configured to set different types of signals from different switches to distinguish various switching signals from each other. For example, the mode setting unit may be configured set one of the input signals from the first switch as a mode switching signal, and to set the other input signal from the first switch as a mode termination signal. The mode setting unit may be further configured to set some of the input signals from the third switch as a sub-mode switching signal, and to set a plurality of modes sequentially activated by the sub-mode switching signal. The mode setting unit may include an acceleration limit level setting unit configured to set the other of the input signals from the third switch as a level adjustment signal for increasing or decreasing an acceleration limit level, and to set an acceleration limit level increased or decreased by the level adjustment signal.

The mode setting unit may set a smart cruise control mode and a driving assist mode as main modes selectable by the first switch. The mode setting unit may set one of the 1A signal and the 1B signal as a signal for selecting the smart cruise control mode in an off state in which there is no activated mode and may set the other signal as a signal for selecting the driving assist mode.

FIG. 11 shows that the 1A signal (e.g., CRUISE Long) is set as the mode switching signal and the 1B signal (e.g., CRUISE Short) is set as the mode termination signal as an example in which the mode switching signal is set.

The driving assist mode may include the state in which both a speed limit assist mode and an acceleration limit mode (SLA+ALC) are activated, the state in which only the speed limit assist mode is activated (SLA), and the state in which only the acceleration limit mode is activated (ALC) as sub-modes.

The mode setting unit may set the mode in which both the speed limit assist mode and the acceleration limit mode (SLA+ALC) are activated as an initial mode, may set the speed limit assist mode (SLA) as a primary transition mode, and may set the acceleration limit mode (ALC Only) as a secondary transition mode, as sub-modes sequentially activated by the sub-mode switching signal.

FIG. 11 shows that, as an example in which the sub-mode switching signal is set, the 3A signal (e.g., Paddle (L) Long) is set as a sub-mode switching signal for performing reverse transition from the secondary transition mode to the primary transition mode and from the primary transition mode to the initial mode, and the 4A signal (e.g., Paddle (R) Long) is set as a sub-mode switching signal for performing forward transition from the initial mode to the primary transition mode and from the primary transition mode to the secondary transition mode.

For example, if the paddle shift is used as the third switch, the options for selecting a transition direction may be given in switching between sub-modes, whereby manipulation convenience may be improved.

The acceleration limit level setting unit may perform a setting control such that acceleration limit levels ACL Lv1 to ACL Lv5 set in the acceleration limit mode are increased or decreased from the current state (e.g., by one level) whenever the level adjustment signal is input.

As shown in FIG. 12, which shows an example in which the acceleration limit level is adjusted, the 3B signal (e.g., Paddle (L) Short) may be set as a level adjustment signal for decreasing the acceleration limit level from the current state by one level, and the 4B signal (e.g., Paddle (R) Short) may be set as a level adjustment signal for increasing the acceleration limit level from the current state by one level, Since the acceleration limit level is adjusted and the options for selecting a transition direction is given in switching order of the sub-modes using the left paddle shift and the right paddle shift (e.g., while an input signal generated when the paddle shift is long pressed and/or an input signal generated when the paddle shift is short pressed are used as a sub-mode switching signal and a level adjustment signal, as described above), the driver may conveniently and rapidly change various modes while safely driving the vehicle.

Since the switching order of the sub-modes is changeable in both directions using the left paddle shift and the right paddle shift, a rapid selection of sub-modes may be possible.

An acceleration limit function control method will be described with reference to FIG. 13.

Figure 13:
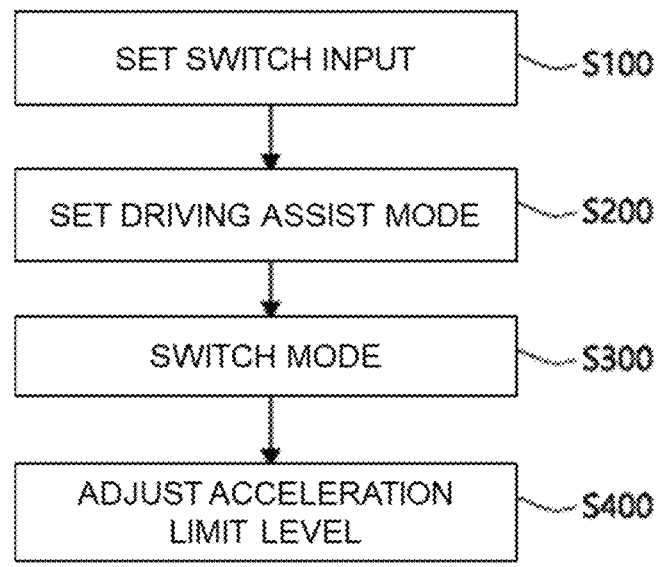
FIG. 13 is a flowchart showing an acceleration limit function control method.

Referring to FIG. 13, the acceleration limit function control method may include a switch input setting step (S100), a driving assist mode setting step (S200), a mode switching step (S300), and an acceleration limit level adjustment step (S400). The switch input setting step (S100) may include setting an input signal from a first switch as a mode switching signal for activating an acceleration limit mode and setting an input signal from a second switch as a level adjustment signal for increasing or decreasing an acceleration limit level of the acceleration limit mode. The driving assist mode setting step (S200) may include setting a smart cruise control mode and a driving assist mode selectable by the mode switching signal and performing a setting control such that the driving assist mode is provided with at least two sub-modes including the acceleration limit mode. The mode switching step (S300) may include selectively activating the acceleration limit mode while the sub-modes are changed in a preconfigured transition order upon receiving the mode switching signal. The acceleration limit level adjustment step (S400) may include increasing or decreasing the current acceleration limit level upon receiving the level adjustment signal in the state in which the acceleration limit mode is activated.

In the switch input setting step (S100), the first switch and the second switch may be configured such that input signals from switches provided to manipulate functions other than an acceleration limit function can be used in activating the acceleration limit mode and adjusting the acceleration limit level such that a control of the original functions is not disturbed.

For example, the first switch may be implemented by a cruise main switch capable of determining whether to perform a smart cruise control (SCC) function/operation, and the second switch may be implemented by an inter-vehicle distance setting switch capable of setting an inter-vehicle distance.

A 1A signal (e.g., generated if a driver presses the first switch for a preconfigured first input duration of time) and a 1B signal (e.g., generated if the driver presses the first switch for a second input duration of time shorter than the first input duration of time) may be separately input from the first switch. A 2A signal (e.g., generated if the driver presses the second switch for a preconfigured third input duration of time) and a 2B signal (e.g., generated if the driver presses the second switch for a fourth input duration of time shorter than the third input duration of time) may be separately input from the second switch.

In the switch input setting step (S100), one of the input signal generated by the first switch being pressed for the first input duration of time and the input signal generated by the first switch being pressed for the second input duration of time may be set as a mode switching signal for sequentially changing a mode that is activated, and the other signal may be set as a mode termination signal for turning off the activated mode.

For example, in the switch input setting step (S100), one of the input signal generated by the second switch being pressed for the third input duration of time and the input signal generated by the second switch being pressed for the fourth input duration of time may be set as a level adjustment signal for increasing the acceleration limit level, and the other signal may be set as a level adjustment signal for decreasing the acceleration limit level.

For example, in the driving assist mode setting step (S200), the smart cruise control mode and the driving assist mode may be set as main modes selectable by the first switch, and a setting may be implemented such that the driving assist mode includes the state in which both a speed limit assist mode and an acceleration limit mode (SLA+ALC) are activated, the state in which only the speed limit assist mode is activated (SLA), and the state in which only the acceleration limit mode is activated (ALC) as sub-modes.

For example, in the driving assist mode setting step (S200), the mode in which both the speed limit assist mode and the acceleration limit mode (SLA+ALC) are activated may be set as an initial mode, the speed limit assist mode (SLA Only) may be set as a primary transition mode, and the acceleration limit mode (ALC Only) may be set as a secondary transition mode.

The transition order of the sub-modes selectively activated in the driving assist mode by the mode switching signal may be set differently from the above order. For example, the mode in which the speed limit assist mode (SLA Only) is activated may be set as the initial mode, the mode in which both the speed limit assist mode and the acceleration limit mode (SLA+ALC) are activated may be set as the primary transition mode, and the acceleration limit mode (ALC Only) may be set as the secondary transition mode. As explained above, various settings may be possible.

For example, in the mode switching step (S300), the driving assist mode may be selected by the mode switching signal, whereby the preconfigured initial mode is activated, and subsequently, the mode may be switched from the initial mode to the primary transition mode, from the primary transition mode to the secondary transition mode, and from the secondary transition mode to the initial mode (e.g., whenever the mode switching signal is input), whereby the driver may determine whether to activate the acceleration limit mode.

For example, in the mode switching step (S300), if a mode switching signal is input during an off state in which there is no activated mode, an entry into the driving assist mode may be performed to activate the predetermined initial mode. If a mode termination signal is input during an off state in which there is no activated mode, the smart cruise control mode, which may be the original function of the first switch, may be activated.

As explained herein, not only the newly added acceleration limit mode but also the smart cruise control mode, which may be the original function, may be activated using the first switch. Thus, it may be possible to conveniently manipulate the newly added function without impeding manipulation of the existing function.

For example, in the step (S400) of increasing or decreasing the acceleration limit level, whenever the level adjustment signal is input in the state in which the acceleration limit mode is activated, the current acceleration limit level may be increased or decreased.

In the step (S400) of increasing or decreasing the acceleration limit level, if a level adjustment signal for increasing the level is input in the state in which the acceleration limit level is the highest level, the acceleration limit level may be changed to the lowest level. If a level adjustment signal for decreasing the level is input in the state in which the acceleration limit level is the lowest level, the acceleration limit level may be changed to the highest level.

To achieve one or more objectives and other advantages, as embodied and broadly described herein, an acceleration limit function control apparatus may include a switch unit including a first switch and a second switch each configured to allow two inputs having different input durations of time to be performed therefrom, a signal setting unit configured to set one of the inputs from the first switch as a mode switching signal for activating an acceleration limit mode and to set each of the inputs from the second switch as a level adjustment signal for increasing or decreasing an acceleration limit level, an acceleration limit mode selection unit configured to activate the acceleration limit mode by the mode switching signal input under predetermined conditions, and an acceleration limit level adjustment unit configured to increase or decrease the acceleration limit level by the level adjustment signal input in the state in which the acceleration limit mode is activated.

The first switch may be constituted by a cruise main switch configured such that a 1A signal, by which the switch is pressed during a predetermined first input duration of time, and a 1B signal, by which the switch is pressed during a second input duration of time shorter than the first input duration of time, are separately manipulated, and the second switch may be constituted by an inter-vehicle distance setting switch configured such that a 2A signal, by which the switch is long pressed during a predetermined third input duration of time, and a 2B signal, by which the switch is pressed during a fourth input duration of time shorter than the third input duration of time, are separately manipulated.

The signal setting unit may include a mode setting unit configured to set one of the input signals from the first switch as a mode switching signal, to set the other input signal as a mode termination signal, and to set a plurality of modes sequentially activated by the mode switching signal, and an acceleration limit level setting unit configured to set one of the input signals from the second switch as a level adjustment signal for increasing a level, to set the other input signal as a level adjustment signal for decreasing a level, and to set an acceleration limit level increased or decreased by the level adjustment signal.

The mode setting unit may set a smart cruise control mode and a driving assist mode as main modes selectable by the first switch, and may set a mode in which both a speed limit assist mode and an acceleration limit mode are activated as an initial mode, may set the speed limit assist mode as a primary transition mode, and may set the acceleration limit mode as a secondary transition mode, as sub-modes sequentially activated by the mode switching signal for the driving assist mode.

The acceleration limit level setting unit may perform setting such that an automatic level of automatically changing the acceleration limit level is further included in consideration of a vehicle driving state acquired through vehicle information.

An acceleration limit function control apparatus may include a switch unit including a first switch and a third switch each configured to allow two inputs having different input durations of time to be performed therefrom, a signal setting unit configured to set some of the inputs from the first switch and the third switch mode switching signal for activating an acceleration limit mode and to set the other of the inputs from the third switch as a level adjustment signal for increasing or decreasing an acceleration limit level, an acceleration limit mode selection unit configured to activate the acceleration limit mode by the mode switching signal input under predetermined conditions, and an acceleration limit level adjustment unit configured to increase or decrease the acceleration limit level by the level adjustment signal input in the state in which the acceleration limit mode is activated.

The first switch may be constituted by a cruise main switch configured such that a 1A signal, by which the switch is pressed during a predetermined first input duration of time, and a 1B signal, by which the switch is pressed during a second input duration of time shorter than the first input duration of time, are separately manipulated, and the third switch may be constituted by a left paddle shift and a right paddle shift configured to allow a 3A signal and a 4A signal, by which the paddle shifts are pressed during predetermined fifth and seventh input durations of time, respectively, to be input therefrom, and a 3B signal and a 4B signal, by which the paddle shifts are pressed during sixth and eighth input durations of time, respectively, shorter than the fifth and seventh input durations of time, respectively, to be input therefrom.

The signal setting unit may include a mode setting unit configured to set one of the input signals from the first switch as a mode switching signal, to set the other input signal as a mode termination signal, to set some of the input signals from the third switch as a sub-mode switching signal, and to set a plurality of modes sequentially activated by the sub-mode switching signal, and an acceleration limit level setting unit configured to set the other of the input signals from the third switch as a level adjustment signal for increasing or decreasing an acceleration limit level and to set an acceleration limit level increased or decreased by the level adjustment signal.

The mode setting unit may set a smart cruise control mode and a driving assist mode as main modes selectable by the first switch, and may set a mode in which both a speed limit assist mode and an acceleration limit mode are activated as an initial mode, may set the speed limit assist mode as a primary transition mode, and may set the acceleration limit mode as a secondary transition mode, as sub-modes sequentially activated by the sub-mode switching signal for the driving assist mode.

The mode setting unit may set the 3A signal as a sub-mode switching signal for performing reverse circulation from the secondary transition mode to the primary transition mode and from the primary transition mode to the initial mode, and may set the 4A signal as a sub-mode switching signal for performing forward circulation from the initial mode to the primary transition mode and from the primary transition mode to the secondary transition mode.

The acceleration limit level setting unit may set one of the 3B signal and the 4B signal as a level adjustment signal for decreasing the acceleration limit level by one level and may set the other as a level adjustment signal for increasing the acceleration limit level by one level.

An acceleration limit function control method may include a switch input setting step of setting an input signal from a first switch as a mode switching signal for activating an acceleration limit mode and setting an input signal from a second switch as a level adjustment signal for increasing or decreasing an acceleration limit level of the acceleration limit mode, a driving assist mode setting step of setting a smart cruise control mode and a driving assist mode selectable by the mode switching signal and performing setting such that the driving assist mode is provided with at least two sub-modes comprising the acceleration limit mode, a mode switching step of selectively activating the acceleration limit mode while the sub-modes are changed in a predetermined circulation order upon receiving the mode switching signal, and a step of increasing or decreasing a current acceleration limit level upon receiving the level adjustment signal in the state in which the acceleration limit mode is activated.

Since whether to activate the acceleration limit mode and the degree in increase and decrease of the acceleration limit level are manipulated using the switches provided to manipulate other different functions during driving, as described above, it may be possible to conveniently perform manipulation of the additional modes without configuring an additional manipulation button. The driver may conveniently use the button(s) while he/she is not distracted by the mode changing operations. Accordingly, it may be possible to simultaneously improve convenience in manipulating the acceleration limit function and driving safety.

Various features and operations described herein may be implemented as a transitory computer-readable program and/or instructions stored in a computer-readable recording medium. The program may be executed by a processor installed in a vehicle. The computer-readable medium may be any type of recording device in which data is stored in a computer-readable manner. The computer-readable medium may include, for example, a hard disk drive (HDD), a solid state disk (SSD), a silicon disk drive (SDD), a read-only memory (ROM), a random access memory (RAM), a compact disc read-only memory (CD-ROM), a magnetic tape, a floppy disk, and an optical data storage device. The programs and/or instructions, when executed by one or more processors, may cause a device to perform one or more operations and/or steps described herein.

As is apparent from the above description, input for activating an acceleration limit mode or increasing or decreasing an acceleration limit level may be performed from a first switch and a second switch or a third switch that a driver can manipulate while the driver looks forward while driving and manipulating the mode changes, whereby it may be possible to improve manipulation convenience and driving safety.

Also, the acceleration limit mode and the acceleration limit level may be manipulated using existing switches provided to manipulate other different functions, whereby it may be possible to avoid reconfiguration of the vehicle parts (e.g., by adding a separate part or device).

Effects obtainable from the aspects of the present disclosure are not limited by the above mentioned effects, and other unmentioned effects can be understood from the above description by those having ordinary skill in the same or similar technical fields.

The above detailed description is not to be construed as limiting the present disclosure in any aspect, but is to be considered by way of example. The scope of the present disclosure should be determined by reasonable interpretation of the accompanying claims, and all equivalent modifications made without departing from the scope of the present disclosure should be understood as being included in the following claims.

What is claimed is:

1. An apparatus comprising:
   at least one processor;
   a plurality of switches comprising a first switch and a second switch, wherein each of the first switch and the second switch is configured to generate at least two input signals each associated with a different input time duration, wherein one of the at least two input signals of the first switch is set as a mode switching signal, and wherein the at least two input signals of the second switch are configured as level adjustment signals to selectively adjust an acceleration limit level among at least three preset levels in a staged manner based on the different input time durations; and
   memory storing instructions that, when executed by the at least one processor, cause the apparatus to:
      activate, based on the mode switching signal, an acceleration limit mode; and
      adjust, based on one of the level adjustment signals, the acceleration limit level in a staged manner among the at least three preset levels while the acceleration limit mode is in an activated state,
   wherein the instructions, when executed by the at least one processor, further cause the apparatus to:
      set a smart cruise control mode and a driving assist mode as main modes selectable by the first switch; and
      set, as sub-modes configured to be sequentially activated by a mode switching signal for the driving assist mode, an initial mode in which both a speed limit assist mode and the acceleration limit mode are activated, a primary transition mode in which the speed limit assist mode is activated, and a secondary transition mode in which the acceleration limit mode is activated.

2. The apparatus according to claim 1, wherein:
   the first switch comprises a cruise main switch configured to generate a first input signal of the at least two input signals of the first switch and a second input signal of the at least two input signals of the first switch, wherein the first input signal of the at least two input signals of the first switch is generated by pressing the cruise main switch for a first time duration, and wherein the second input signal of the at least two input signals of the first switch is generated by pressing the cruise main switch for a second time duration that is greater than the first time duration; and
   the second switch comprises an inter-vehicle distance setting switch configured to generate a first input signal of the at least two input signals of the second switch and a second input signal of the at least two input signals of the second switch, wherein the first input signal of the at least two input signals of the second switch is generated by pressing the inter-vehicle distance setting switch for a third time duration, and wherein the second input signal of the at least two input signals of the second switch is generated by pressing the inter-vehicle distance setting switch for a fourth time duration.

3. The apparatus according to claim 1, wherein a second one of the at least two input signals of the first switch is set as a mode termination signal, and
   wherein the instructions, when executed by the at least one processor, further cause the apparatus to: activate, based on a second mode switching signal, another mode of a plurality of modes.

4. The apparatus according to claim 1, wherein the instructions, when executed by the at least one processor, further cause the apparatus to:
   set, as updated sub-modes configured to be sequentially activated by a mode switching signal for the driving assist mode, an updated initial mode in which the speed limit assist mode is activated, an updated primary transition mode in which both the speed limit assist mode and the acceleration limit mode are activated, and an updated secondary transition mode in which the acceleration limit mode is activated.

5. The apparatus according to claim 1, wherein the instructions, when executed by the at least one processor, further cause the apparatus to:
   set, as updated sub-modes for the driving assist mode, an updated initial mode in which both the speed limit assist mode and the acceleration limit mode are activated and an updated primary transition mode in which the speed limit assist mode is activated, wherein the updated initial mode and the updated primary transition mode are alternately selected in response to a mode switching signal for the driving assist mode.

6. The apparatus according to claim 1, wherein the instructions, when executed by the at least one processor, further cause the apparatus to:
   set, based on a vehicle driving state determined through vehicle information, an automatic level, wherein the acceleration limit level is automatically adjusted based on the automatic level being set.

7. The apparatus according to claim 1, wherein the instructions, when executed by the at least one processor, cause the apparatus to adjust the acceleration limit level from a first acceleration limit level to a second acceleration limit level,
   wherein acceleration of a vehicle is controlled below a first acceleration limit during the acceleration limit level being set to the first acceleration limit level, and
   wherein acceleration of the vehicle is controlled below a second acceleration limit after adjusting the acceleration limit level to the second acceleration limit level.

8. The apparatus according to claim 1, wherein the instructions, when executed by the at least one processor, cause the apparatus to:
   while the acceleration limit mode is in a deactivated state, adjust an inter-vehicle distance according to an input signal of the second switch.

9. An apparatus comprising:
   at least one processor;
   a plurality of switches comprising a first switch and a second switch, wherein each of the first switch and the second switch is configured to generate at least two input signals each associated with a different input time duration, wherein a combination of a first input signal of the at least two input signals of the first switch and a first input signal of the at least two input signals of the second switch is set as a mode switching signal, and wherein at least two remaining input signals of the first switch and the second switch are configured as level adjustment signals to selectively adjust an acceleration limit level among at least three preset levels in a staged manner based on the different input time durations; and memory storing instructions that, when executed by the at least one processor, cause the apparatus to:
activate, based on the mode switching signal, an acceleration limit mode; and
adjust, based on one of the level adjustment signals, the acceleration limit level in a staged manner among the at least three preset levels while the acceleration limit mode is in an activated state, wherein the instructions, when executed by the at least one processor, further cause the apparatus to:
set a smart cruise control mode and a driving assist mode as main modes selectable by the first switch; and
set, as sub-modes configured to be sequentially activated by a sub-mode switching signal for the driving assist mode, an initial mode in which both a speed limit assist mode and the acceleration limit mode are activated, a primary transition mode in which the speed limit assist mode is activated, and a secondary transition mode in which the acceleration limit mode is activated,
wherein the sub-mode switching signal is set based on at least one remaining input signal of the at least two input signals of the second switch.

10. The apparatus according to claim 9, wherein:
the first switch comprises a cruise main switch configured to generate the first input signal of the at least two input signals of the first switch and a second input signal of the at least two input signals of the first switch, wherein the first input signal of the at least two input signals of the first switch is generated by pressing the cruise main switch for a first time duration, and wherein the second input signal of the at least two input signals of the first switch is generated by pressing the cruise main switch for a second time duration that is greater than the first time duration; and
the second switch comprises a left paddle shift and a right paddle shift,
the left paddle shift is configured to generate the first input signal of the at least two input signals of the second switch and a second input signal of the at least two input signals of the second switch, wherein the first input signal of the at least two input signals of the second switch is generated by pressing the left paddle shift for a third time duration, and wherein the second input signal of the at least two input signals of the second switch is generated by pressing the left paddle shift for a fourth time duration, and
the right paddle shift is configured to generate a third input signal of the at least two input signals of the second switch and a fourth input signal of the at least two input signals of the second switch, wherein the third input signal of the at least two input signals of the second switch is generated by pressing the right paddle shift for a fifth time duration, and wherein the fourth input signal of the at least two input signals of the second switch is generated by pressing the right paddle shift for a sixth time duration.

11. The apparatus according to claim 10, wherein the instructions, when executed by the at least one processor, further cause the apparatus to:
set the first input signal of the at least two input signals of the second switch as a sub-mode switching signal for performing a reverse transition from a secondary transition mode to a primary transition mode or from the primary transition mode to an initial mode; and
set the third input signal of the at least two input signals of the second switch as a sub-mode switching signal for performing a forward transition from the initial mode to the primary transition mode or from the primary transition mode to the secondary transition mode.

12. The apparatus according to claim 10, wherein the instructions, when executed by the at least one processor, further cause the apparatus to:
set one of the second input signal of the at least two input signals of the second switch and the fourth input signal of the at least two input signals of the second switch as a level adjustment signal for decreasing the acceleration limit level; and
set the other one of the second input signal of the at least two input signals of the second switch and the fourth input signal of the at least two input signals of the second switch as a level adjustment signal for increasing the acceleration limit level.

13. The apparatus according to claim 9, wherein a second input signal of the at least two input signals of the first switch is set as a mode termination signal, and
wherein the instructions, when executed by the at least one processor, further cause the apparatus to: activate, based on a sub-mode switching signal, another mode of a plurality of modes, wherein the sub-mode switching signal is set based on at least one remaining input signal of the at least two input signals of the second switch.

14. A method performed by an apparatus of a vehicle, the method comprising:
setting an input signal of a first switch of the vehicle as a mode switching signal for activating an acceleration limit mode;
setting, as level adjustment signals, a plurality of input signals of a second switch of the vehicle, each corresponding to a different input time duration, for selectively adjusting an acceleration limit level among at least three preset levels;
setting a smart cruise control mode and a driving assist mode that are selectable by the mode switching signal;
setting, for the driving assist mode, at least two sub-modes comprising the acceleration limit mode;
activating, based on receiving the mode switching signal, the acceleration limit mode, wherein the at least two sub-modes are changed in a preconfigured transition order; and
adjusting, based on one of the level adjustment signals, the acceleration limit level among the at least three preset levels in a staged manner while the acceleration limit mode is in an activated state,
wherein the setting the driving assist mode comprises:
setting the smart cruise control mode and the driving assist mode as main modes selectable by the first switch, and
setting, as sub-modes configured to be sequentially activated by a mode switching signal for the driving assist mode, an initial mode in which both a speed limit assist mode and the acceleration limit mode are activated, a primary transition mode in which the speed limit assist mode is activated, and a secondary transition mode in which the acceleration limit mode is activated.

15. The method according to claim 14, wherein:
the first switch comprises a cruise main switch configured to generate the input signal of the first switch as a first input signal of the first switch and generate a second input signal of the first switch, wherein the first input signal of the first switch is generated by pressing the cruise main switch for a first time duration, and the second input signal of the first switch is generated by pressing the cruise main switch for a second time duration that is different from the first time duration; and the method further comprises setting the second input signal of the first switch as a mode termination signal for deactivating the acceleration limit mode.

16. The method according to claim 14, wherein:
the second switch comprises an inter-vehicle distance setting switch to generate the input signal of the second switch as a first input signal of the second switch and generate a second input signal of the second switch, wherein the first input signal of the second switch is generated by pressing the inter-vehicle distance setting switch for a third time duration, and the second input signal of the second switch is generated by pressing the inter-vehicle distance setting switch for a fourth time duration, and the setting the plurality of input signals of the second switch as the level adjustment signals comprises:
  setting the first input signal of the second switch as a level adjustment signal for increasing the acceleration limit level, and
  setting the second input signal of the second switch as a level adjustment signal for decreasing the acceleration limit level.

* * * * *